US009732780B2

(12) United States Patent
Anderson et al.

(10) Patent No.: US 9,732,780 B2
(45) Date of Patent: Aug. 15, 2017

(54) CANTILEVER ASSEMBLY

(71) Applicant: IMPulse NC LLC, Mount Olive, NC (US)

(72) Inventors: Randy Anderson, Mount Olive, NC (US); Robert Marrs, Mount Olive, NC (US); Edward Aguilar, Mount Olive, NC (US)

(73) Assignee: IMPULSE NC LLC, Mount Olive, NC (US)

( * ) Notice: Subject to any disclaimer, the term of this patent is extended or adjusted under 35 U.S.C. 154(b) by 0 days.

(21) Appl. No.: 14/618,383

(22) Filed: Feb. 10, 2015

(65) Prior Publication Data

US 2016/0177993 A1      Jun. 23, 2016

Related U.S. Application Data

(60) Provisional application No. 62/094,343, filed on Dec. 19, 2014.

(51) Int. Cl.
| | |
|---|---|
| *F16B 7/18* | (2006.01) |
| *B60M 1/20* | (2006.01) |
| *B60M 1/24* | (2006.01) |

(52) U.S. Cl.
CPC .............. *F16B 7/187* (2013.01); *B60M 1/20* (2013.01); *B60M 1/24* (2013.01)

(58) Field of Classification Search
CPC .. B60M 1/20; B60M 1/23; B60M 1/24; Y10T 403/7064; Y10T 403/7066;

(Continued)

(56) References Cited

U.S. PATENT DOCUMENTS

| | | | |
|---|---|---|---|
| 446,546 | A | 2/1891 | Cook |
| 1,076,630 | A | 10/1913 | Davis |

(Continued)

FOREIGN PATENT DOCUMENTS

| | | |
|---|---|---|
| CN | 201272254 | 7/2009 |
| DE | 3207238 | 9/1983 |

(Continued)

OTHER PUBLICATIONS

International Search Report and Written Opinion from PCT/US2012/020467 dated May 4, 2012.

(Continued)

*Primary Examiner* — Jonathan Liu
*Assistant Examiner* — Guang H Guan
(74) *Attorney, Agent, or Firm* — Levenfeld Pearlstein, LLC

(57) ABSTRACT

A cantilever assembly includes a cantilever arm having longitudinal fastening channels and slots in communication with the fastening channels. The assembly also includes an attachment bracket featuring a first leg portion and a second leg portion defining a seat there between with the leg portions featuring apertures. Bolts having threaded shafts are positioned through the apertures of the attachment bracket and engage the threaded bores of nut plates positioned in the fastening channels of the cantilever arm. As a result, when the bolts are turned, the nut plates engage side walls of the fastening channels and the distal ends of the bolts engage a central pipe portion of the cantilever arm.

15 Claims, 10 Drawing Sheets

(58) Field of Classification Search
CPC ......... Y10T 403/7067; Y10T 403/7094; Y10T 403/7117; F16B 7/187; F16B 37/045
USPC ........ 191/40, 41, 42; 52/655.1, 81.3, 73, 74; 403/253–258; 248/222.14, 223.41, 298.1; 411/84, 85
See application file for complete search history.

(56) References Cited

U.S. PATENT DOCUMENTS

| | | | |
|---|---|---|---|
| 2,700,705 A | | 1/1955 | Anjeskey et al. |
| 3,222,464 A | | 12/1965 | Dehn |
| 3,462,110 A | | 8/1969 | Cheslock |
| 3,644,688 A | | 2/1972 | Tustin et al. |
| 3,975,580 A | * | 8/1976 | Lewis ...................... H02G 7/20 174/45 R |
| 4,163,537 A | | 8/1979 | Mourgue |
| 4,496,061 A | | 1/1985 | Highsmith |
| 4,523,054 A | * | 6/1985 | Baker .................... H01B 17/00 174/148 |
| 4,679,672 A | | 7/1987 | Seddon et al. |
| 4,941,763 A | | 7/1990 | Euteneuer |
| 5,192,145 A | * | 3/1993 | Rixen ..................... F16B 7/187 403/187 |
| 5,380,961 A | | 1/1995 | Ronning et al. |
| 5,634,300 A | | 6/1997 | Huebner et al. |
| 5,657,842 A | | 8/1997 | Krenkel et al. |
| 5,746,535 A | * | 5/1998 | Kohler ............... A47B 47/0041 403/230 |
| 5,772,158 A | | 6/1998 | Blanding |
| 5,881,851 A | | 3/1999 | Cipriani |
| 5,979,119 A | | 11/1999 | Trafton |
| 6,185,887 B1 | | 2/2001 | Strassle |
| 6,347,592 B1 | | 2/2002 | Gessert |
| 6,349,912 B1 | | 2/2002 | Schauss et al. |
| 6,565,279 B1 | * | 5/2003 | Skovronski ........... F16B 7/0486 256/65.05 |
| 6,584,918 B2 | * | 7/2003 | Lee ...................... A47B 13/021 108/155 |
| 6,712,543 B1 | * | 3/2004 | Schmalzhofer ......... F16B 7/187 403/187 |
| 7,090,174 B2 | | 8/2006 | Korczak et al. |
| 7,159,262 B2 | | 1/2007 | Jackson |
| 7,389,621 B2 | | 6/2008 | Hawes |
| 7,441,311 B2 | | 10/2008 | Lovgren et al. |
| 7,654,057 B2 | | 2/2010 | Zambelli et al. |
| 7,748,420 B2 | | 7/2010 | Young |
| 7,931,420 B2 | * | 4/2011 | Maffeis ................... E04B 1/585 248/298.1 |
| 8,100,600 B2 | * | 1/2012 | Blum .................... F16B 37/045 403/256 |
| 8,752,684 B2 | * | 6/2014 | Pasta ........................ B60M 1/20 191/41 |
| 8,888,056 B2 | | 11/2014 | Lu et al. |
| 2004/0036389 A1 | * | 2/2004 | Tsai .......................... H05K 7/18 312/265.4 |
| 2006/0180702 A1 | * | 8/2006 | Pfeifer .................... B65H 75/10 242/609.1 |
| 2007/0277445 A1 | | 12/2007 | Michell |
| 2009/0064626 A1 | | 3/2009 | Sen |
| 2010/0226732 A1 | | 9/2010 | Baumgartner et al. |
| 2012/0061197 A1 | | 3/2012 | Pasta et al. |
| 2012/0175479 A1 | * | 7/2012 | Graham .................. B60M 1/20 248/291.1 |
| 2016/0177993 A1 | * | 6/2016 | Anderson ................ B60M 1/24 248/70 |

FOREIGN PATENT DOCUMENTS

| | | |
|---|---|---|
| GB | 800575 | 8/1958 |
| GB | 835227 | 5/1960 |
| GB | 904944 | 9/1962 |
| GB | 933972 | 8/1963 |
| JP | 56079031 | 6/1981 |
| JP | H11-81487 | 3/1999 |
| JP | 2003080977 | 3/2003 |
| JP | 2004276882 | 10/2004 |
| RU | 2021919 | 10/1994 |
| WO | WO0013929 | 3/2000 |
| WO | WO 2010136955 | 12/2010 |
| WO | WO2012/094584 | 7/2012 |

OTHER PUBLICATIONS

International Preliminary Report on Patentability from PCT/US2012/020467 dated Jul. 10, 2013.
http://www.castlecraft.com/trailex_storage_racks.htm, retrieved on Aug. 5, 2010.
http://www.mudstuff.co.uk/Cargo_Tracking_Mac'sTieDowns.shtml, retrieved on Aug. 5, 2010.
Genuine Toyota Accessories PT278-35112 Bed Cleat.
English Translation of JP 2003080977 published Mar. 19, 2003.
English Translation of CN 201272254 published Jul. 15, 2009.
English Translation of DE 3207238 published Sep. 1, 1983.
English Translation of JP 20046882 published Oct. 7, 2004.
http://en.wikipedia.org/wiki/File:Extruded_aluminium_section_x3.jpg.
File History of U.S. Appl. No. 12/930,488 retrieved from PAIR on Aug. 18, 2015.
English Abstract of JP H11-81487 published Mar. 26, 1999.
U.S. Appl. No. 12/930,448, filed Jan. 7, 2011, pending.

* cited by examiner

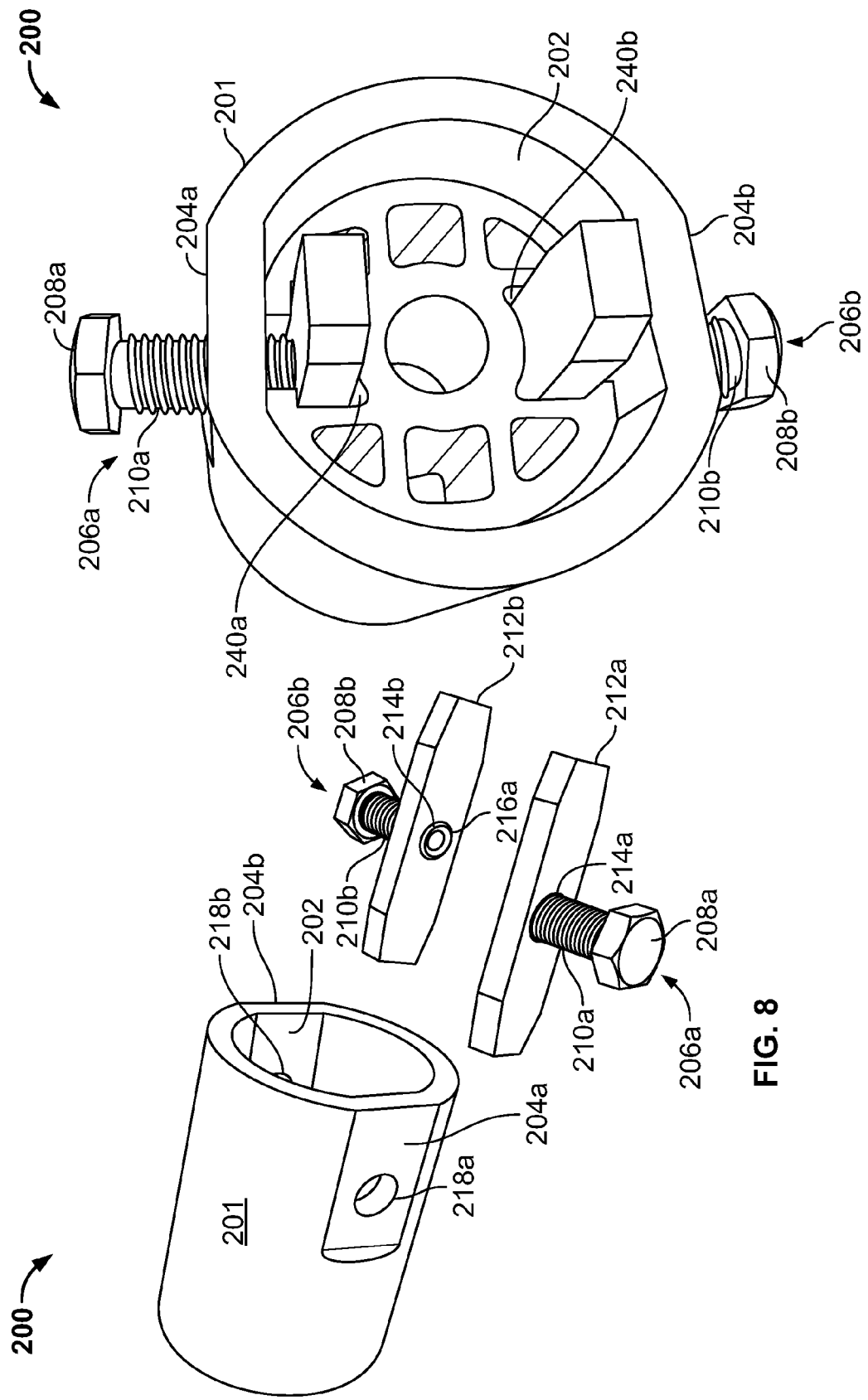

CANTILEVER ASSEMBLY

CLAIM OF PRIORITY

This application claims priority to U.S. Provisional Application Ser. No. 62/094,343, filed Dec. 19, 2014, the entire contents of which are hereby incorporated by reference.

FIELD OF THE INVENTION

The present invention relates to overhead contact systems in the transit traction power industry and, more particularly, to a cantilever assembly for such systems.

BACKGROUND

Electrified train transit systems are popular in urban settings due to their low level of pollution and high efficiency and reliability. Such transit systems typically feature an electric locomotive that pulls train cars for carrying passengers and that receives power from an overhead contact system. Overhead contact systems typically feature messenger and contact wires that are suspended over the track that the electric train cars travel on. The top of the electric locomotive is provided with a pantograph which contacts the contact wire so that the locomotive receives power.

The messenger and contact wires are typically suspended by a cantilever assembly, such as the one indicated in general at 8 in FIG. 1. As illustrated in FIG. 1, the cantilever assembly includes two or more insulated, rigid cantilever arms, illustrated at 10 and 12, that are attached by their proximal ends via members 14 and 16 to a pole 18 positioned next to the tracks. The distal end of the lower cantilever arm 12, which features a tilted orientation, is typically attached to the underside of the upper cantilever arm 10, which is positioned in a generally horizontal orientation. As a result, the lower cantilever arm provides support for the upper cantilever arm. A messenger saddle 20 is typically positioned at the distal end of the upper cantilever arm. A steady arm 21 is typically attached by its proximal end to the lower cantilever arm, and an insulated swivel clamp 22 for the contact wire is typically positioned at the distal end of the steady arm. The messenger passes over the saddle 20 and its ends are connected to the contact wire by hangers to form a bridal assembly where the contact wire is suspended by both the swivel clamp 22 and the messenger cable.

As is clear from the above, the cantilever assembly, which includes the upper and lower cantilever arms and the steady arm, are critical components for securing and maintaining contact and messenger wire heights and locations in an overhead contact system. Steel pipe is typically used for the upper and lower cantilever arms and the steady arm. This makes the components heavy and difficult to handle and install. A need therefore exists for a cantilever and steady arms that provide a reduction in weight.

As is also likely apparent from the above, the cantilever assembly must be properly configured for optimal performance. In addition, a large number of cantilever assemblies must be assembled and installed for an overhead contact system. As illustrated in FIG. 1, prior art cantilever assemblies typically use clevis pipe clamps 24 and 26 to secure the distal end of the lower cantilever arm to the underside of the upper cantilever arm and to secure the proximal end of the steady arm to the lower cantilever arm. Such clamps feature a number of different parts that are difficult to handle during installation and may become easily separated and lost. In addition, assembly and tightening of the clamps is time consuming. A need therefore also exists for a fastening bracket for the cantilever and steady arms of a cantilever assembly that is quick and easy to install and that remains as a single assembly during installation.

BRIEF DESCRIPTION OF THE DRAWINGS

FIG. 8 is an exploded view of an embodiment of an end cap assembly;

FIG. 9 is an enlarged end perspective view of the end cap assembly of FIG. 8;

DETAILED DESCRIPTION OF EMBODIMENTS

Figure 2:
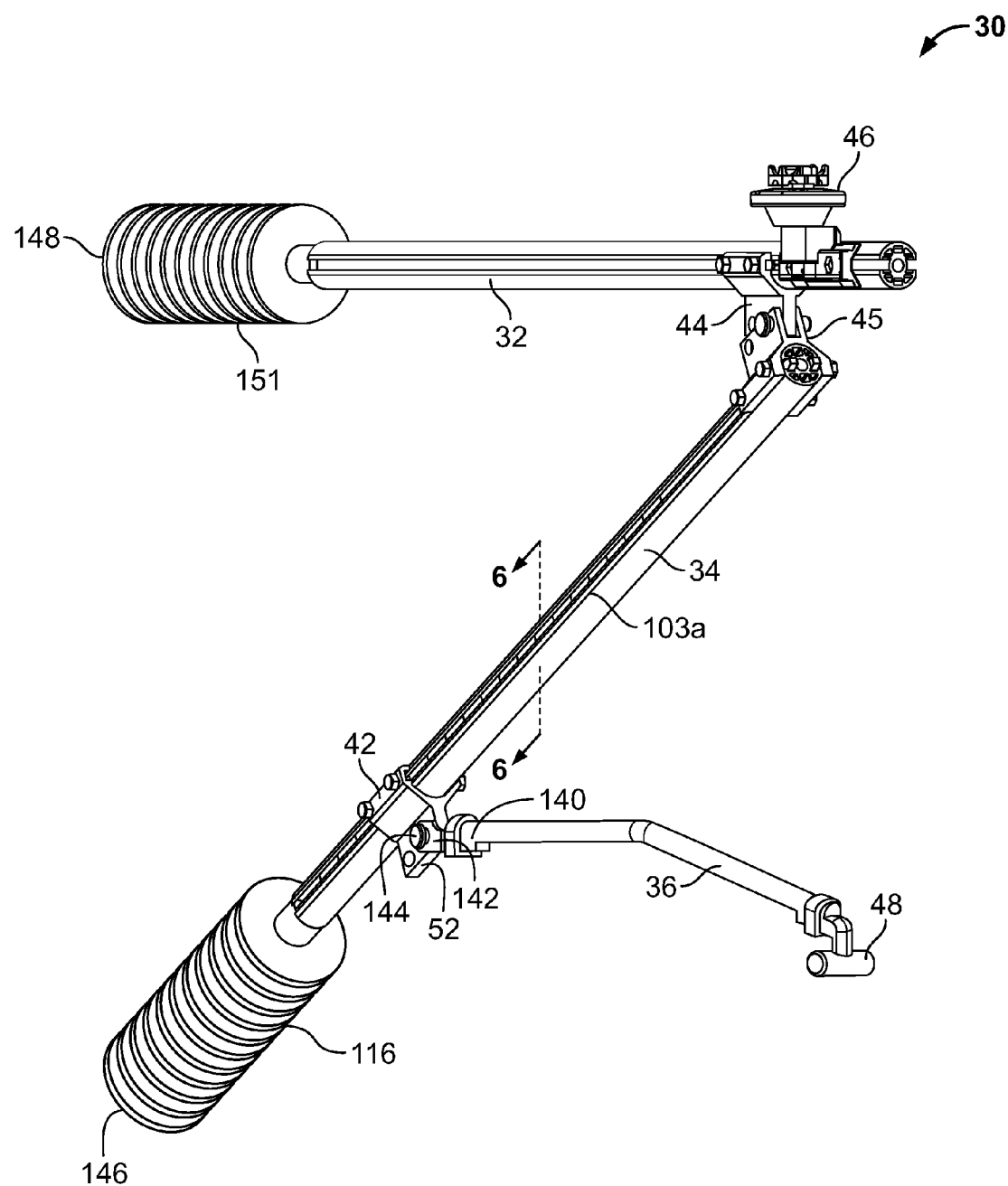
FIG. 2 is a perspective view of an embodiment of the cantilever assembly of the invention.

An embodiment of the cantilever assembly of the present invention is indicated in general at 30 in FIG. 2. The assembly includes an upper cantilever arm 32, a lower cantilever arm 34 and a steady arm 36. The upper and lower cantilever arms 32 and 34 and the steady arm 36 are each preferably extruded from aluminum. The steady arm preferably includes an inverted U-shaped cross section to provide weight and material savings while providing rigidity. Alternative materials, such as plastics or composites, and manufacturing methods may alternatively be used for each component. In accordance with the present invention, the three components are secured together with attachment brackets 42, 44 and 45, as described in greater detail below. Attachment brackets 42, 44 and 45 are also preferably extruded from aluminum. A messenger saddle 46 is positioned on the distal end of the upper cantilever arm 32, while a contact wire swivel clamp 48 is attached to the distal end of the steady arm 36.

The outside diameter of the upper and lower cantilever arms 32 and 34 preferably matches that of a steel pipe (typically 2.375 inches). This allows the attachment of hardware already designed for a nominal 2 inch pipe.

Figure 3:
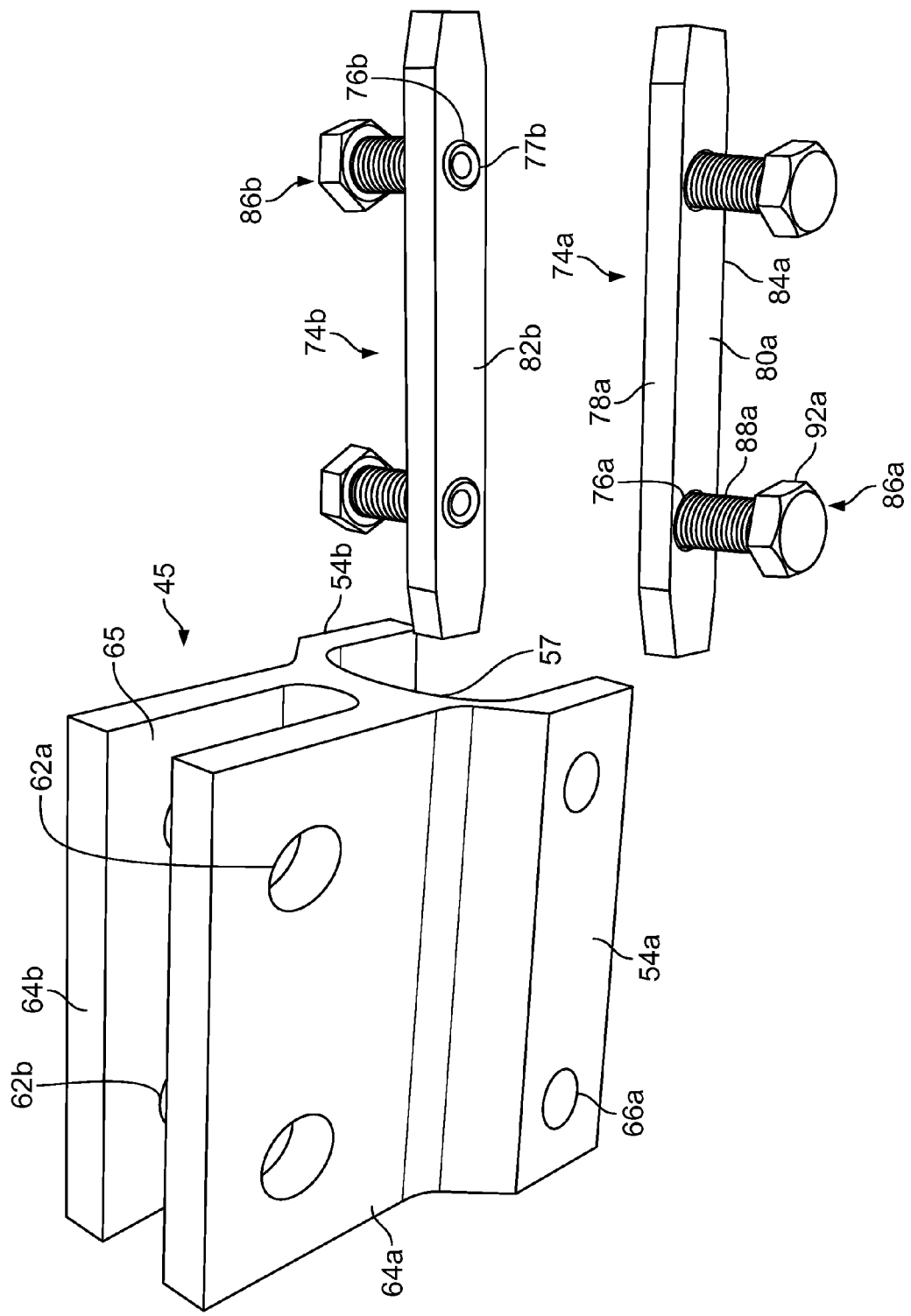
FIG. 3 is an exploded view of an embodiment of an attachment bracket of the cantilever assembly of FIG. 2.

An enlarged view of attachment bracket 45 is provided in FIG. 3. As is apparent from FIG. 3, the attachment bracket features a generally H-shaped cross section with a pair of top fins 64a and 64b and downwardly extending leg portions 54a and 54b. The inner surfaces of leg portions 54a and 54b define a generally U-shaped seat 57. A pair of openings 62a and 62b are provided in each fin connector portion 64a and 64b. In addition, apertures 66a and 66b are provided in the leg portions 54a and 54b. The number of openings and apertures shown are examples only and the fin and leg portions of the attachment bracket may be provided with more or less openings and apertures as is suitable for the application. In addition, a single fin may be substituted for the pair of top fins 64a and 64b, or an alternative number of top fins may otherwise be used.

A pair of nut plates, indicated in general at 74a and 74b in FIG. 3, feature threaded bores 76a and 76b that receive bolts, such as those indicated in general at 86a and 86b. More specifically, as illustrated for bolt 86a, each bolt features a threaded shaft 88a and a head 92a, with the threaded shaft received within a corresponding nut plate threaded bore 76a. The distal end of each bolt threaded shaft optionally features a cup point, as illustrated at 77b for bolt 86b. As illustrated for nut plate 74a, each nut plate also features a top surface 78a, an outer surface 80a, a bottom surface 84a and, as illustrated for nut plate 74b, an inner surface 82b.

Figure 4:
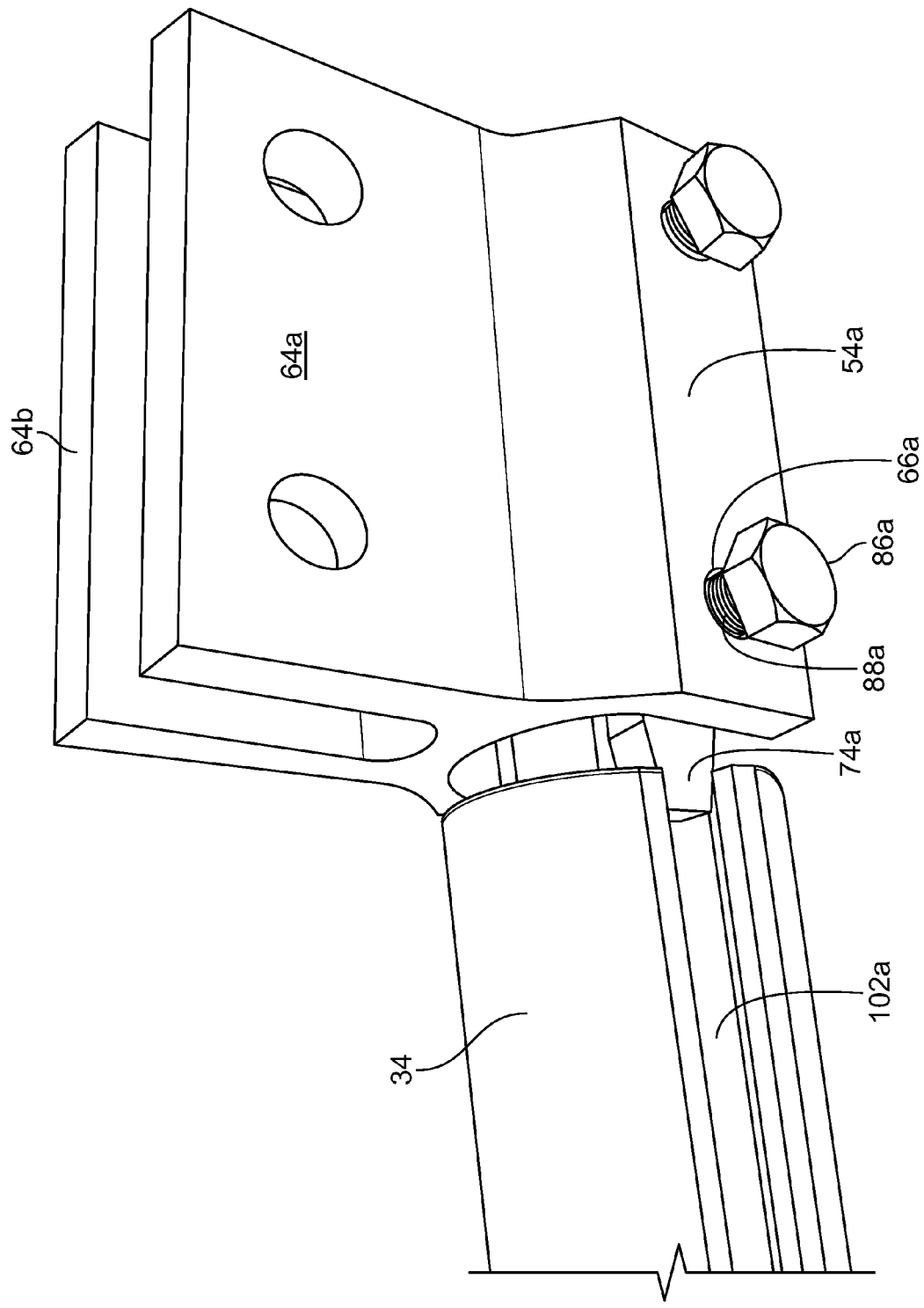
FIGS. 4 is an assembled view of the attachment bracket of FIG. 3 being installed on the lower cantilever arm of FIG. 2.
Figure 5:
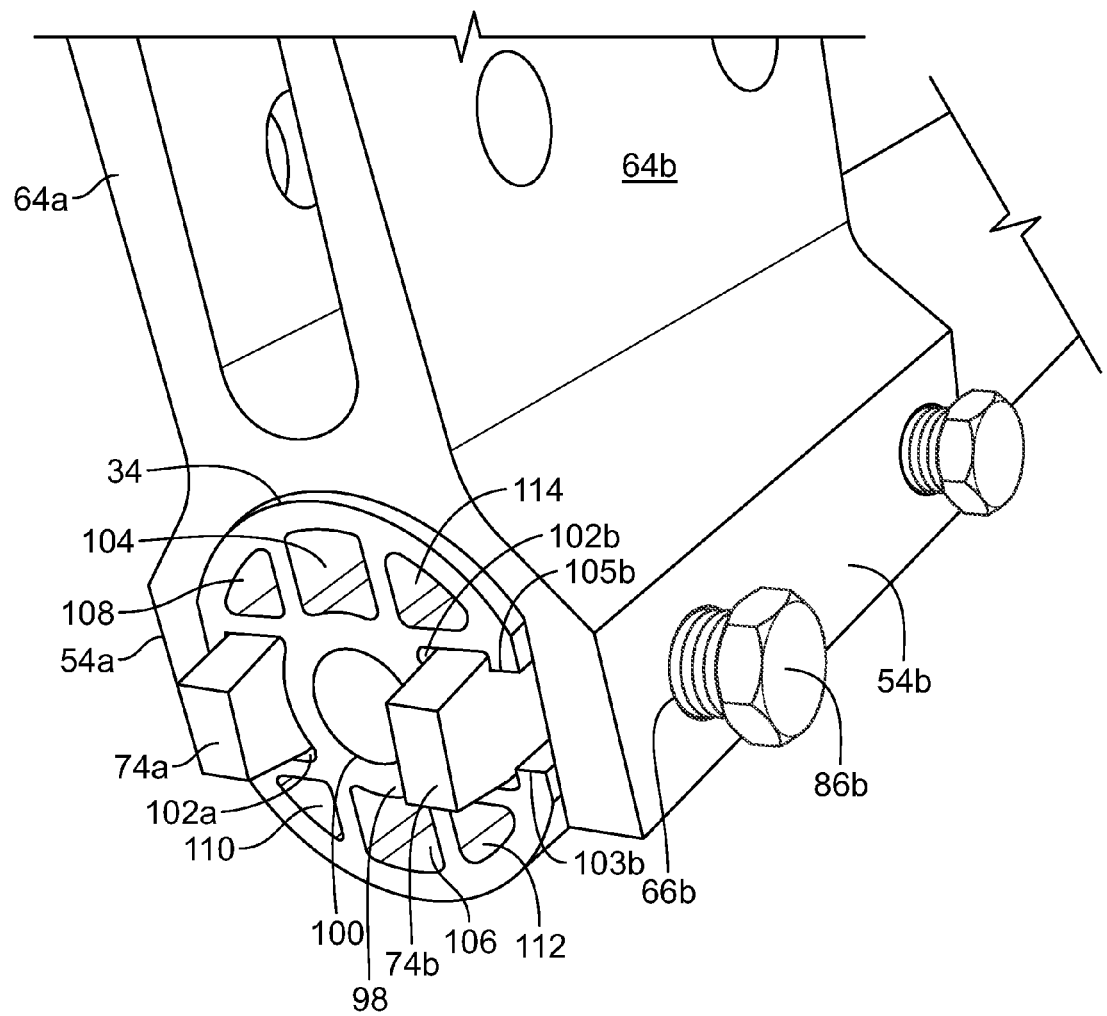
FIG. 5 is an assembled view of the attachment bracket of FIG. 3 installed on the lower cantilever arm of FIG. 2.

As illustrated in FIGS. 4 and 5, the pair of bolts 86a and 86b of each leg portion 54a and 54b pass through corresponding apertures 66a (FIGS. 4) and 66b (FIG. 5) of leg portions 54a and 54b of the attachment bracket. The threaded shafts (such as 88a and 88b) of the bolts have diameters that are sized smaller than the diameters of the corresponding apertures (such as 66a and 66b) so that the threads of the bolts do not engage the apertures (which are not threaded) as the bolts pass there through.

To install the attachment bracket onto a cantilever arm, the bolts, assembled through the apertures of the attachment bracket leg portions, are initially unscrewed with respect to the nut plates so that the cup points (on the distal ends of the bolt threaded shafts) are generally flush with, or recessed with respect to, the inner surfaces of the nut plates so as not to protrude radially inward therefrom. An example of this is shown in FIG. 3 with cup point 76b of bolt 86b with respect to inner surface 82b of nut plate 74b, but with the bolts 86b (and 86a) not positioned through the apertures 66a and 66b of legs 54a and 54b of the attachment bracket for ease of viewing/illustrative purposes only. In actuality, the bolts 86a and 86b are placed in the positions illustrated in FIG. 3 after they are passed through the apertures 66a and 66b of the leg portions 54a and 54b of the attachment bracket and then attached to the nut plates 74a and 74b, as illustrated in FIGS. 4 and 5.

With reference to FIGS. 4 and 5, the nut plates 74a and 74b are then slid into channels 102a and 102b of cantilever arm 34 so that the cantilever arm is positioned within the U-shaped seat (57 in FIG. 3) of the attachment bracket. As best shown in FIGS. 3 and 4, the nut plates 74a and 74b each feature tapered ends to facilitate their insertion into the channels 102a and 102b of the cantilever arm.

Figure 6:
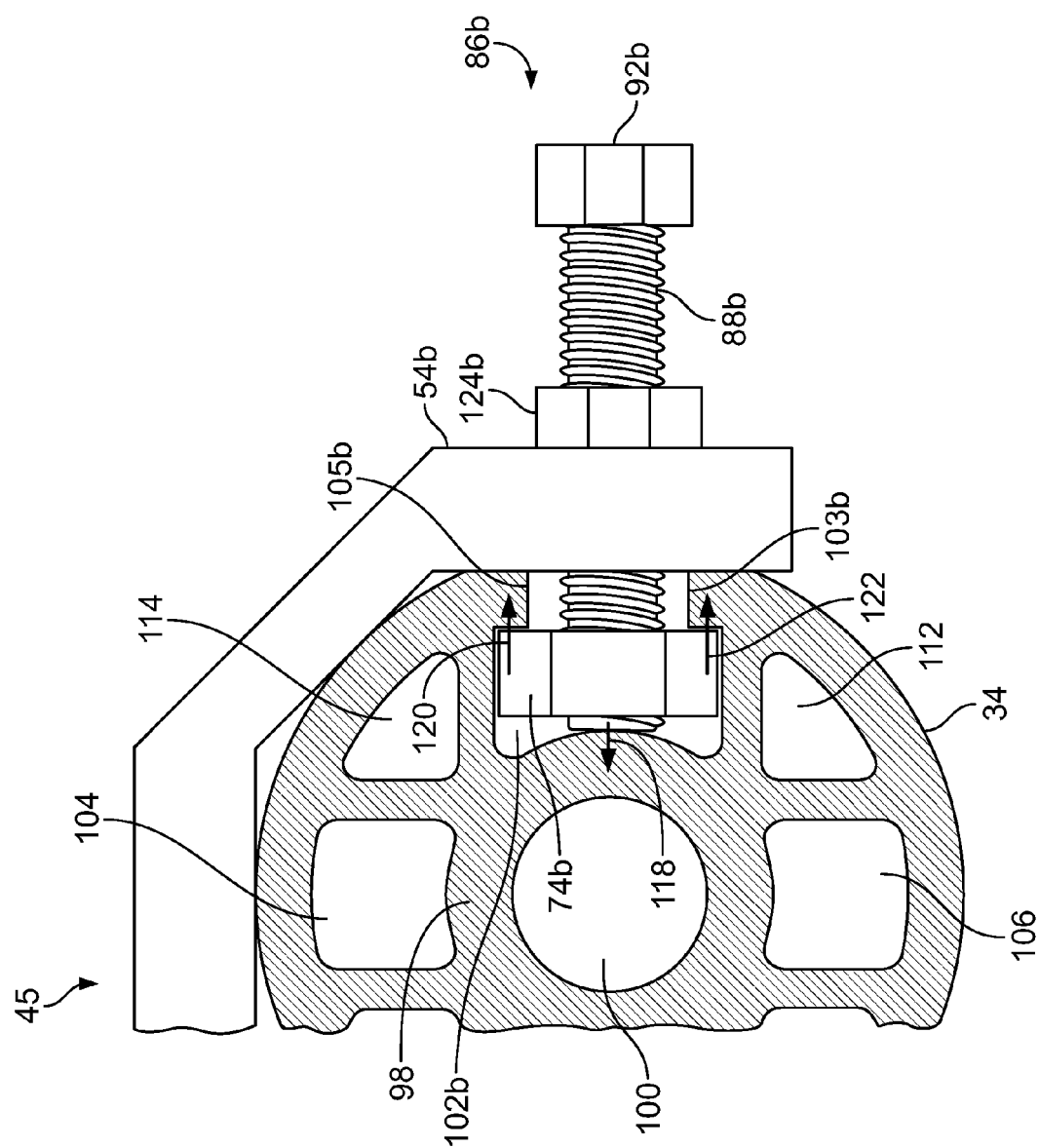
FIG. 6 is an enlarged partial end elevational view of the attachment bracket and lower cantilever arm of FIG. 5.

As illustrated in FIGS. 5 and 6, lower cantilever arm 34 features a central pipe portion 98 that defines central cylindrical bore 100 and that is flanked by the longitudinal fastening channels 102a and 102b. As illustrated in FIGS. 5 and 6, fastening channel 102b features side opening slots bordered by lower wall 103b and upper wall 105b. Fastening channel 102a is similarly configured. In order to provide weight and material savings, the cantilever arm 34 also preferably includes generally square ducts 104, 106 and generally triangular ducts 108, 110, 112 and 114 that run parallel to central bore 100 and fastening channels 102a and 102b. Central bore 100 is preferably threaded so that components such as insulator 116 (FIG. 2) may be attached to the cantilever arm. Upper cantilever arm 32 (FIG. 2) features the same construction as lower cantilever arm 34. Alternative embodiments of the upper and lower cantilever arms may optionally eliminate, or vary the shape of, some or all of the square and triangular ducts, as well as the central bore. For example, as shown in the cantilever arm 332 of FIG. 11, all the ducts may be generally circular in shape. In addition, alternative embodiments of the cantilever arms may feature an overall cross section that is a shape other than round (such as octagonal, square, triangular, etc.). Of course the shape of the leg portions and seat of the attachment bracket would have to be changed accordingly.

The dimensions of the seat 57 of the attachment bracket correspond to the diameter and positions of the slots of the cantilever arm so that the slots align with the apertures 66a and 66b of the leg portions 54a and 54b of the attachment bracket when the cantilever arm is positioned within the seat 57.

With reference to FIGS. 5 and 6, with the lower cantilever arm 34 positioned in the seat 57 of the attachment bracket, and the nut plates positioned within channels 102a and 102b, the bolts of the attachment bracket may be turned to lock the attachment bracket in the selected position on the lower cantilever arm. As the bolts are turned, they force the nut plates outward to press against the cantilever arm, securing the assembly in place. More specifically, as illustrated for bolt 86a in FIG. 6, bolt head 92b is turned with a tool so that the outer surface of the nut plate 74b engages the inner surfaces of lower and upper walls 103b and 105b of the cantilever arm 34, as illustrated by arrows 120 and 122. In addition, the distal end of the threaded shaft 88b, which optionally features the cup point (77b of FIG. 3), presses or "bites" into the outer surface of the central pipe portion 98 of the cantilever arm, as illustrated by arrow 118. As a result, the nut plates 74a and 74b are secured or retained within the channels 102a and 102b of the cantilever arm 34 and the attachment bracket is secured to the cantilever arm.

With reference to FIG. 6, and as illustrated for bolt 86b, a lock or jam nut 124b may optionally be provided on the threaded shaft 88b of each bolt so as to be positioned between the head 92b of the bolt and a corresponding leg portion (54b for bolt 86b). After each bolt is tightened as described above, the corresponding lock or jam nut 124b is tightened so as to engage the outer surface of the leg portion (54b for bolt 86b) of the attachment bracket to lock the bolt in the engaged configuration.

As a result, with reference to FIG. 2, the attachment bracket 45 is quickly and securely fastened to the lower cantilever arm 34.

Figure 7:
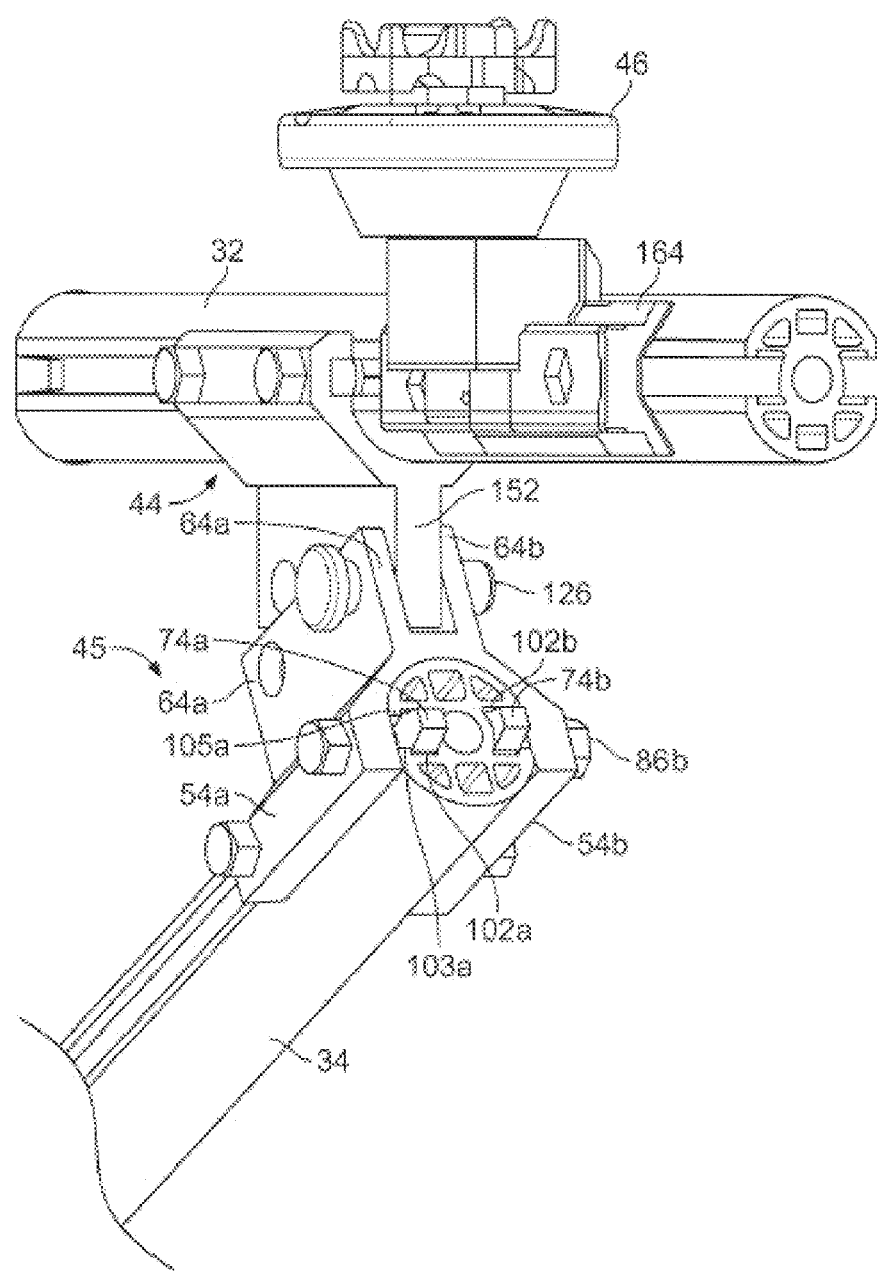
FIG. 7 is an enlarged perspective view of the distal ends of the upper and lower cantilever arms with the attachment brackets and other components installed.

As illustrated in FIG. 7, the lower fin 152 of the attachment bracket 44 engaging the upper cantilever arm 32 is received in the space 65 (FIG. 3) between the upper fins 64a and 64b of the attachment bracket 45 secured to the lower cantilever arm 34 and is held in place by a pin, bolt or other fastener 126 passing through the opposing pair of openings in upper fins 64a and 64b and a corresponding opening formed in lower fin 152.

With reference to FIG. 2, the steady arm 36 is attached at its proximal end 140 by a connector 142 to the fin 52 of the attachment bracket 42. The connector 142 is secured to the tin by a bolt or other fastener 144 that passes through opening (not shown) of the fin 52.

Figure 1:
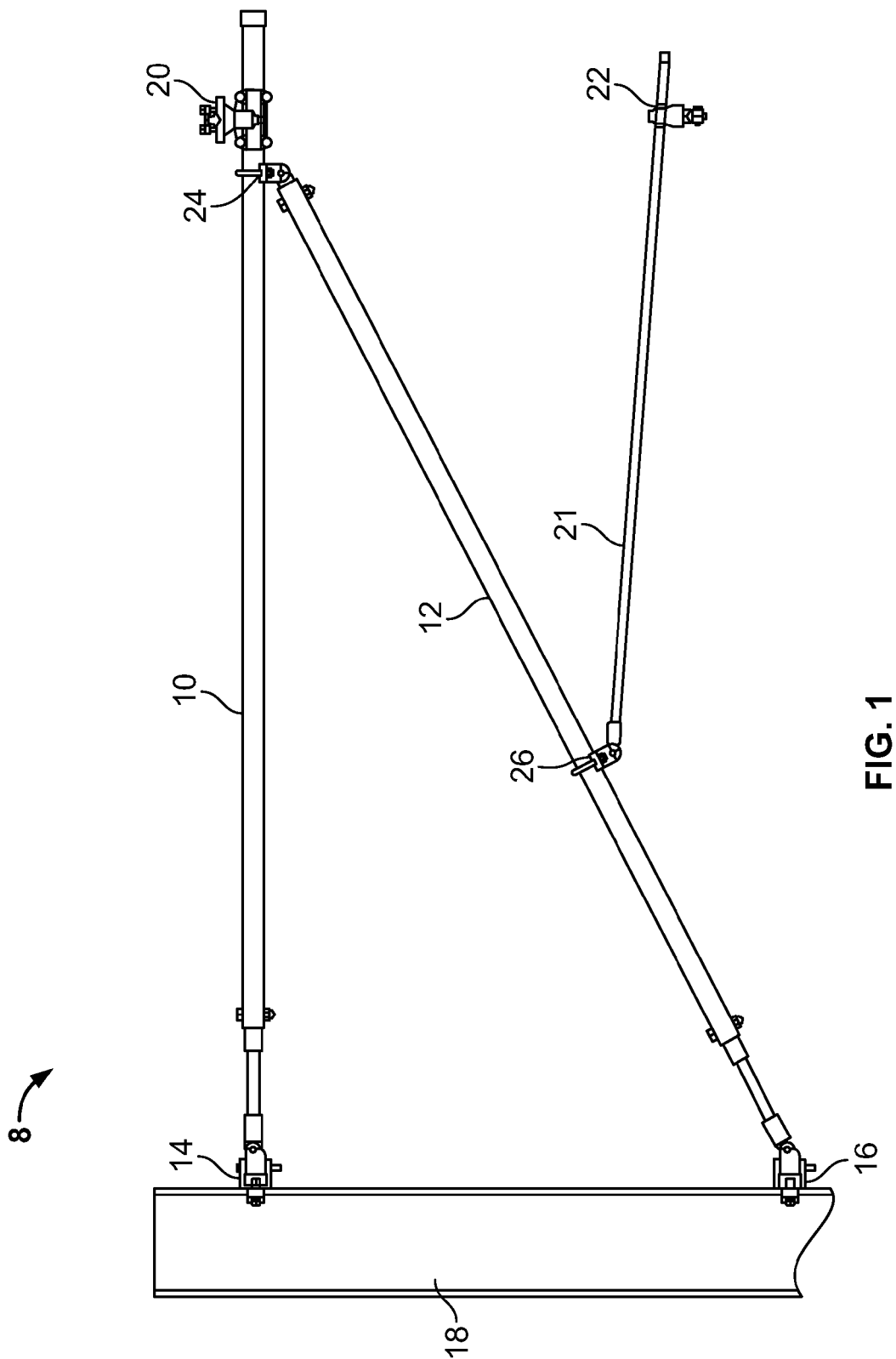
FIG. 1 is a side elevational view of a prior art cantilever assembly.

With reference to FIG. 2, the proximal ends 146 and 148 of insulators 116 and 151 are adapted to be mounted to a support such as a wall or pole (not shown), such as in the manner illustrated in FIG. 1. The insulators may be excluded so that the proximal ends of the upper and lower cantilever arms 32 and 34 are instead attached to the pole or wall.

With reference to FIG. 7, a messenger seat 46 is attached to the distal end of the upper cantilever arm. This preferably is accomplished by a bracket 164 that also engages a fastening channel of the upper cantilever arm.

Figure 10:
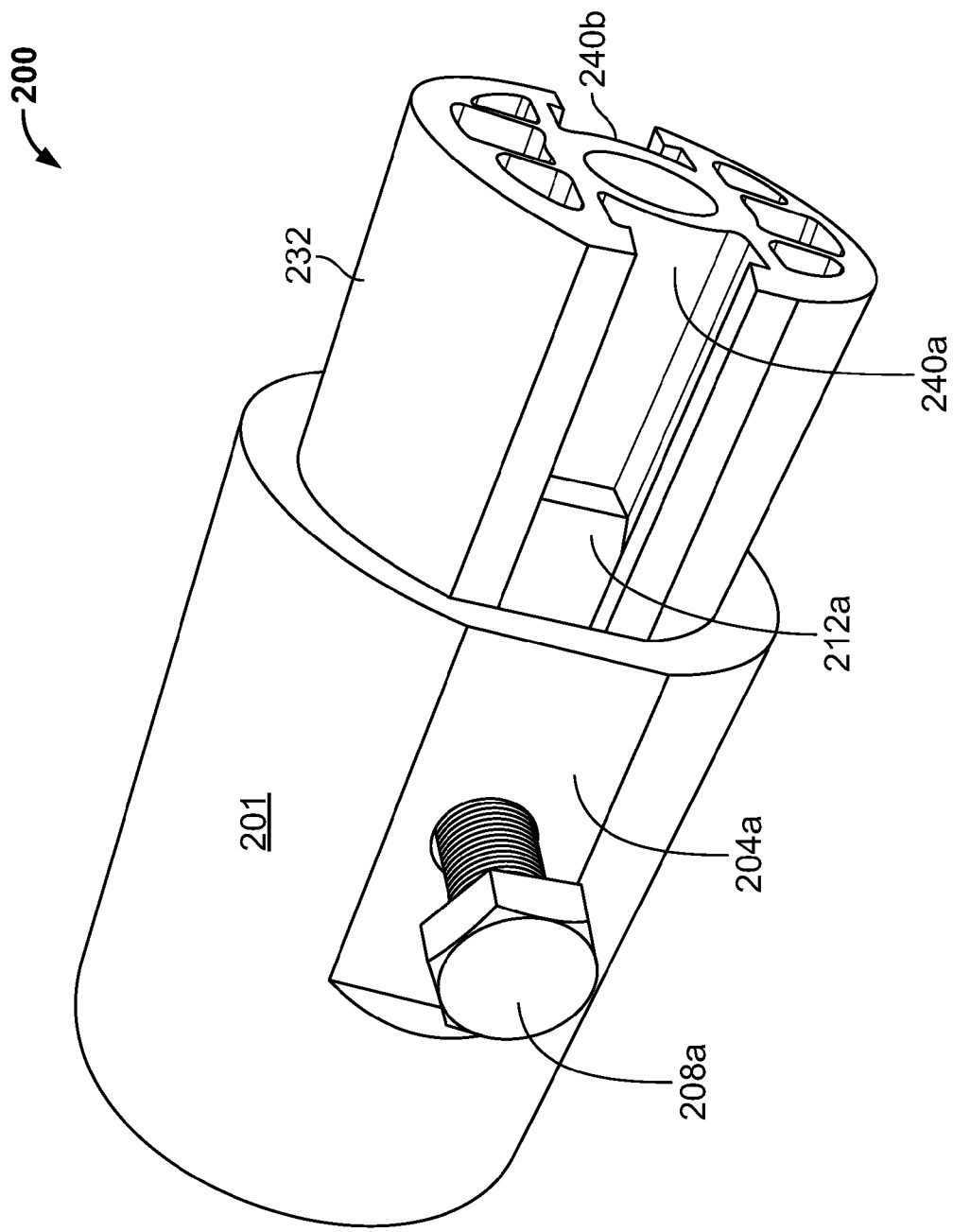
FIG. 10 is a side perspective view of the end cap assembly of FIG. 9 being installed on a cantilever arm.

With reference to FIGS. 8-10, an end cap or cup is indicated in general at 200. As will be explained below, the end cup may be used to attach an insulator (such as 151 or 116 of FIG. 2) to a cantilever arm. The cup may be used in other ways as well. The cup features a generally cylindrical body 201 that defines an interior space 202 and is provided with opposing side openings 218a and 218b. Each opening is preferably surrounded by a flattened portion 204a and 204b to facilitate engagement of the heads 208a and 208b of bolts 206a and 206b with a wrench or other tool. The bolts feature threaded shafts 210a and 210b that are sized to pass though the openings 218a and 218b (which are not threaded). The threaded shafts of the bolts engage threaded openings 214a and 214b of nut plates 212a and 212b, which feature a construction similar to the nut plates 74a and 74b described above with respect to FIGS. 3-7. As illustrated for bolt 206a, the distal end of the threaded shaft of each bolt may optionally be provided with a cup point 216a.

Figure 11:
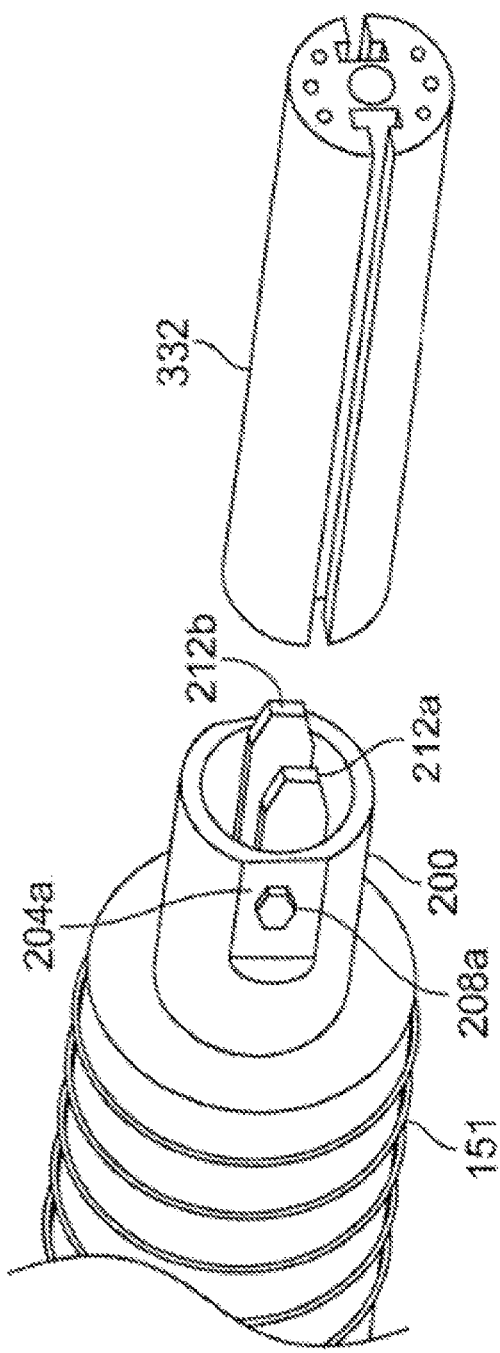
FIG. 11 is a partial side perspective view of the end cap assembly of FIGS. 8-10 installed on an insulator.

With reference to FIG. 11, the closed end of the end cup is secured to an insulator 151 via a bolt or other fastener passing through an opening in the closed end of the end cup. Alternative fastening arrangements known in the art may be used to attach the end cup to the insulator. As explained below, this provides quick assembly of the insulator to cantilever arm.

Next, to install the cup 200 (and therefore insulator 151) onto a cantilever arm, the bolts 206a and 206b are initially unscrewed (via heads 208a and 208b) with respect to the nut plates 212a and 212b so that the optional cup points 216 are flush with, or recessed with respect to, the inner surfaces of the nut plates 212a and 212b. This is shown in FIG. 8 but with the bolts 206a and 206b not positioned through the openings 218a and 218b of the cup body for ease of illustration. In actuality, the bolts 206a and 206b are placed in the positions illustrated in FIG. 8 after they are passed through the openings 218a and 218b of the cup body and then attached to the nut plates 212a and 212b, as illustrated in FIGS. 9-11.

With reference to FIGS. 9 and 10, the nut plates 212a and 212b are then slid into channels 240a and 240b of cantilever arm 232 so that the end portion of the cantilever arm is may be received within the interior space 202 of the cup body. As best shown in FIGS. 8 and 9, the nut plates 212a and 212b each feature tapered ends to facilitate their insertion into the channels 240a and 240b of the cantilever arm.

In reference to FIG. 10, with the end portion of cantilever arm 232 positioned in the interior space of cup 200, and the nut plates positioned within channels 240a and 240b, the heads 208a and 208b of bolts 206a and 206b are turned using a tool to force the nut plates outward to press against the cantilever arm, securing the assembly in place. More specifically, the outer surfaces of the nut plates engage the inner surfaces of lower and upper walls that define the slots of the cantilever arm, in the manner illustrated in FIG. 6 for attachment bracket 45 while the optional cup points (such as 216a of FIG. 8) on the distal ends of the threaded shafts 210a and 210b of the bolts press or "bite" into the central pipe portion of the cantilever arm while. As a result, the nut plates 212a and 212b are secured or retained within the channels 240a and 240b of the cantilever arm 232 and the cup 200, as illustrated in FIG. 10, is attached to the cantilever arm 232 end portion so that the insulator 151 (FIG. 11) is attached to the cantilever arm 232 end portion. Lock or jam nuts (such as 124b of FIG. 6) may optionally be provided on the threaded shafts 210a and 210b of the bolts 206a and 206b and may be tightened so as to engage the flattened surfaces 204a and 204b of the cup body to lock the bolts 206a and 206b in the secured position. The cantilever arm 232 (FIG. 10) is identical to the cantilever arm 332 (FIG. 11) with the exception of the shapes of the internal ducts. The cantilever arms 232, 332 may be used interchangeably with the end cup 200.

The above embodiment of the present invention therefore provides a lightweight but rugged and durable structure whereby the components are quickly and securely fastened together. The above embodiment also allows for quick adjustment of the cantilever assembly and allows other components to be quickly, easily and securely attached to the upper and/or the lower cantilever arms.

While the preferred embodiments of the invention have been shown and described, it will be apparent to those skilled in the art that changes and modifications may be made therein without departing from the spirit of the invention, the scope of which is defined by the following claims.

What is claimed is:

1. A cantilever assembly comprising:
   a) a cantilever arm having a first longitudinal fastening channel and a first slot in communication with the first longitudinal fastening channel, the first slot defined by spaced apart side walls;
   b) an attachment bracket featuring a first leg portion and a second leg portion, the first and second leg portions defining a seat therebetween with said first leg portion featuring a first aperture;
   c) said first aperture in alignment with the first slot of the cantilever arm when the cantilever arm is positioned in the seat of the attachment bracket;
   d) a first bolt having a threaded first shaft portion and a first head portion, wherein the first shaft portion extends into the first longitudinal fastening channel and the first head portion is positioned externally of the first longitudinal fastening channel;
   e) the first shaft portion of said first bolt movably passing through the first aperture of the attachment bracket;
   f) a first nut plate having a threaded bore and positioned within the first longitudinal fastening channel and threadedly engaging the threaded first shaft portion of the first bolt so that when the first bolt is rotated, the first nut plate engages the spaced apart side walls defining the first slot; and
   g) a first lock nut positioned on the first bolt of the first threaded bolt and positioned between the first head portion of the first bolt and a first exterior surface of the first leg portion of the attachment bracket,
   h) wherein the cantilever arm further includes a central pipe portion having an outer surface, the outer surface forming a part of the first longitudinal fastening channel at an opposite side of the first longitudinal fastening channel from the spaced apart side walls in a longitudinal direction of the first shaft portion, and wherein the first shaft portion of the first bolt includes a first distal end that directly engages the outer surface of the central pipe portion while the first nut plate engages the spaced apart side walls defining the first slot in response to rotation of the first bolt.

2. The cantilever assembly of claim 1 wherein the first distal end of the first bolt includes a cup point where said cup point engages the central pipe portion while the first nut plate engages the spaced apart side walls defining the first slot when the first bolt is turned.

3. The cantilever assembly of claim 1 wherein the spaced apart side walls include a first upper wall and a first lower wall, the first upper and lower walls spaced from each other so as to define the first slot.

4. The cantilever assembly of claim 1 wherein the cantilever arm also includes a second longitudinal fastening channel and a second slot in communication with the second longitudinal fastening channel and the second leg portion of the attachment bracket featuring a second aperture in alignment with the second slot of the cantilever arm when the cantilever arm is positioned in the seat of the attachment bracket, and the cantilever assembly further comprising:
 a second bolt having a second shaft portion and a second head portion;
 the second shaft portion of said second bolt movably passing through the second aperture of the attachment bracket; and
 a second nut plate positioned within the second longitudinal fastening channel and attached to the second shaft portion of the second bolt so that when the second bolt is rotated, the second nut plate engages spaced apart side walls defining the second slot.

5. The cantilever assembly of claim 4 wherein the second shaft portion of the second bolt is threaded and the second nut plate includes a second threaded bore that is engaged by the second shaft portion of the second bolt.

6. The cantilever assembly of claim 5 wherein the second shaft portion of the second bolt includes a second distal end that engages the outer surface of the central pipe portion while the second nut plate engages the spaced apart side walls defining the second slot in response to rotation of the second bolt.

7. The cantilever assembly of claim 6 wherein the spaced apart side walls defining the first slot include a first upper wall and a first lower wall, the first upper and lower walls spaced from each other so as to define the first slot and the spaced apart side walls defining the second slot include a second upper wall and a second lower wall, the second upper and lower walls spaced from each other so as to define the second slot.

8. The cantilever assembly of claim 6 further comprising a second lock nut nut positioned on the threads of the second shaft portion of the second bolt and positioned between the second head portion of the second bolt and a second exterior surface of the second leg portion of the attachment bracket.

9. The cantilever assembly of claim 6 wherein the first distal end of the first bolt includes a first cup point where said first cup point engages the outer surface of the central pipe portion while the first nut plate engages the spaced apart side walls defining the first slot in response to rotation of the first bolt and wherein the second distal end of the second bolt includes a second cup point where said second cup point engages the outer surface of the central pipe portion while the second nut plate engages the spaced apart side walls defining the second slot in response to rotation of the second bolt.

10. The cantilever assembly of claim 1 wherein the central pipe portion includes a central bore running parallel to the first longitudinal fastening channel and a plurality of ducts running parallel to the first longitudinal fastening channel and the central bore.

11. The cantilever assembly of claim 10 wherein the central bore is threaded.

12. The cantilever assembly of claim 1 wherein the first nut plate includes opposing end portions that are tapered.

13. The cantilever assembly of claim 1 further comprising an end cup including:
 i. a body defining an interior space adapted to receive an end portion of the cantilever arm, said body having a first side opening;
 ii. a first fastener featuring a first threaded shaft movably passing through the first side opening; and
 iii. a first cup nut plate positioned within the first longitudinal fastening channel and attached to the first threaded shaft of the first fastener by a threaded bore so that when the first fastener is turned, the first cup nut plate engages the spaced apart side walls defining the first slot.

14. The cantilever assembly of claim 13 wherein the end cup further includes:
 iv. a second side opening formed in the body;
 v. a second fastener featuring a second threaded shaft movably passing through the second side opening; and
 vi. a second cup nut plate positioned within a second longitudinal fastening channel of the cantilever arm and attached to the second threaded shaft of the second fastener by a threaded bore so that when the second fastener is turned, the second cup nut plate engages spaced apart side walls defining a second slot in communication with the second longitudinal fastening channel.

15. The cantilever assembly of claim 14 wherein the body features flattened surface portions surrounding the first and second side openings.

* * * * *

UNITED STATES PATENT AND TRADEMARK OFFICE
CERTIFICATE OF CORRECTION

PATENT NO. : 9,732,780 B2
APPLICATION NO. : 14/618383
DATED : August 15, 2017
INVENTOR(S) : Anderson et al.

It is certified that error appears in the above-identified patent and that said Letters Patent is hereby corrected as shown below:

On the Title Page

Item (72), Name and Address of the Inventor, Column 1, Line 1, "Randy Anderson, Mount Olive, NC" to read as --Randel Anderson, KENANSVILLE, NC--.

In the Specification

Column 4, Line 48, "32is" to read as --32 is--.

Column 4, Line 58, "tin" to read as --fin--.

In the Claims

Column 7, Line 42, Claim 8, "lock nut nut" to read as --lock nut--.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*